United States Patent
Zhang et al.

(10) Patent No.: US 9,816,872 B2
(45) Date of Patent: Nov. 14, 2017

(54) LOW POWER LOW COST TEMPERATURE SENSOR

(71) Applicant: QUALCOMM Incorporated, San Diego, CA (US)

(72) Inventors: Junmou Zhang, San Diego, CA (US); Chuang Zhang, San Diego, CA (US); Nan Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 593 days.

(21) Appl. No.: 14/300,110

(22) Filed: Jun. 9, 2014

(65) Prior Publication Data

US 2015/0355033 A1    Dec. 10, 2015

(51) Int. Cl.
*G01K 7/01* (2006.01)
*G01K 13/00* (2006.01)
*G01K 15/00* (2006.01)

(52) U.S. Cl.
CPC ............ *G01K 7/015* (2013.01); *G01K 13/00* (2013.01); *G01K 15/005* (2013.01)

(58) Field of Classification Search
CPC .......... G01K 7/01; G01K 3/005; G01K 7/425; H01L 21/67248
See application file for complete search history.

(56) References Cited

U.S. PATENT DOCUMENTS

| | | | |
|---|---|---|---|
| 4,387,349 A * | 6/1983 | Rapp | H03K 3/3545 331/116 FE |
| 5,336,943 A | 8/1994 | Kelly et al. | |
| 5,563,760 A | 10/1996 | Lowis et al. | |
| 5,902,044 A * | 5/1999 | Pricer | G01K 3/14 374/112 |
| 5,961,215 A * | 10/1999 | Lee | G01K 7/01 374/178 |
| 6,084,391 A * | 7/2000 | Onodera | G05F 3/242 323/313 |
| 6,084,462 A | 7/2000 | Barker | |

(Continued)

FOREIGN PATENT DOCUMENTS

JP    H11346143 A    12/1999
TW    201118357 A    6/2011

OTHER PUBLICATIONS

International Search Report and Written Opinion—PCT/US2015/031430—ISA/EPO—dated Jul. 23, 2015.

(Continued)

*Primary Examiner* — Gail Kaplan Verbitsky
(74) *Attorney, Agent, or Firm* — Loza & Loza LLP

(57) ABSTRACT

Systems and methods for sensing temperature on a chip are described herein. In one embodiment, a temperature sensor comprises a first transistor having a gate, a second transistor having a gate coupled to the gate of the first transistor, and a bias circuit configured to bias the gates of the first and second transistors such that the first and second transistors operate in a sub-threshold region, and to generate a current proportional to a difference between a gate-to-source voltage of the first transistor and a gate-to-source voltage of the second transistor. The temperature sensor also comprises an analog-to-digital converter (ADC) configured to convert the current into a digital temperature reading.

30 Claims, 7 Drawing Sheets

(56) References Cited

U.S. PATENT DOCUMENTS

| | | | |
|---|---|---|---|
| 6,735,110 B1* | 5/2004 | Lesea | G11C 11/4125 365/148 |
| 6,799,889 B2 | 10/2004 | Pennock | |
| 6,896,408 B2* | 5/2005 | Tokunaga | G01K 7/01 327/512 |
| 7,880,533 B2* | 2/2011 | Marinca | G05F 3/30 327/539 |
| 7,944,271 B2* | 5/2011 | Illegems | G05F 3/242 327/513 |
| 8,061,894 B2* | 11/2011 | Nishimura | G01K 7/015 374/170 |
| 8,177,426 B2* | 5/2012 | Guo | G01K 3/005 327/512 |
| 9,234,804 B2* | 1/2016 | Englasyam | G01K 7/015 |
| 2007/0030049 A1* | 2/2007 | Yoshikawa | G01K 7/01 327/512 |
| 2007/0200608 A1* | 8/2007 | Fang | H03H 11/26 327/261 |
| 2008/0072183 A1* | 3/2008 | Hershenson | G06F 17/5045 716/115 |
| 2008/0143449 A1 | 6/2008 | Chung et al. | |
| 2008/0238563 A1 | 10/2008 | Kim et al. | |
| 2008/0252360 A1* | 10/2008 | Yoshikawa | G01K 7/01 327/512 |
| 2009/0027243 A1* | 1/2009 | Leung | H01L 23/48 341/100 |
| 2010/0141328 A1* | 6/2010 | Meninger | H03L 7/0812 327/512 |
| 2010/0201427 A1* | 8/2010 | van den Berg | H03K 3/012 327/333 |
| 2011/0001546 A1* | 1/2011 | Guo | G01K 3/005 327/512 |
| 2011/0106742 A1* | 5/2011 | Pino | G06N 3/0635 706/33 |
| 2011/0169551 A1* | 7/2011 | Stanescu | G01K 7/01 327/512 |
| 2011/0255568 A1 | 10/2011 | Swei | |
| 2013/0170520 A1* | 7/2013 | Englasyam | G01K 7/015 374/178 |
| 2013/0266042 A1* | 10/2013 | John | G01K 7/01 374/178 |
| 2014/0023114 A1* | 1/2014 | Liu | G01K 7/01 374/178 |
| 2014/0061728 A1* | 3/2014 | Trivedi | H01L 29/785 257/253 |
| 2014/0111252 A1* | 4/2014 | Zhuo | H03F 1/301 327/109 |
| 2015/0037635 A1 | 2/2015 | Reihlen et al. | |
| 2015/0037645 A1 | 2/2015 | Ramani et al. | |
| 2016/0138978 A1* | 5/2016 | Eberlein | G01K 7/01 374/170 |
| 2016/0178457 A1* | 6/2016 | Pigott | G01K 15/007 374/1 |
| 2016/0258819 A1* | 9/2016 | Xia | G01K 7/01 |
| 2017/0023416 A1* | 1/2017 | Kim | G01K 7/01 |

OTHER PUBLICATIONS

Michiel A. P. Pertijs, et at., "A CMOS Smart Temperature Sensor With a 3δ Inaccuracy of 0.1C From -55C to 125C", IEEE Journal of Solid-State Circuits, p. 2805, vol. 40, No. 12, Dec. 2005.

* cited by examiner

LOW POWER LOW COST TEMPERATURE SENSOR

BACKGROUND

Field

Aspects of the present disclosure relate generally to temperature sensing, and more particularly, to temperature sensors.

Background

A plurality of temperature sensors may be integrated on a chip and used to monitor temperature at various locations on the chip. Temperature readings from the sensors may be fed to a temperature management device that manages circuits (e.g., central processing unit (CPU)) on the chip based on the temperature readings. For example, the temperature management device may manage the circuits based on the temperature readings to prevent the temperature at one or more locations on the chip from becoming too high, which can potentially damage the chip. In this example, if a temperature reading rises above a temperature threshold, then the temperature management device may take steps to reduce the temperature (e.g., reduce a frequency of a circuit).

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to a first aspect, a temperature sensor is described herein. The temperature sensor comprises a first transistor having a gate, a second transistor having a gate coupled to the gate of the first transistor, and a bias circuit configured to bias the gates of the first and second transistors such that the first and second transistors operate in a sub-threshold region, and to generate a current proportional to a difference between a gate-to-source voltage of the first transistor and a gate-to-source voltage of the second transistor. The temperature sensor also comprises an analog-to-digital converter (ADC) configured to convert the current into a digital temperature reading.

A second aspect relates to a method for sensing temperature. The method comprises biasing a gate of a first transistor and a gate of a second transistor such that the first and second transistors operate in a sub-threshold region, and generating a current proportional to a difference between a gate-to-source voltage of the first transistor and a gate-to-source voltage of the second transistor. The method also comprises converting the current into a digital temperature reading.

A third aspect relates to an apparatus for sensing temperature. The apparatus comprises means for biasing a gate of a first transistor and a gate of a second transistor such that the first and second transistors operate in a sub-threshold region, and means for generating a current proportional to a difference between a gate-to-source voltage of the first transistor and a gate-to-source voltage of the second transistor. The apparatus also comprises means for converting the current into a digital temperature reading.

A fourth aspect relates to a system comprising a temperature sensor and a temperature management device. The temperature sensor comprises a first transistor having a gate, a second transistor having a gate coupled to the gate of the first transistor, and a bias circuit configured to bias the gates of the first and second transistors such that the first and second transistors operate in a sub-threshold region, and to generate a current proportional to a difference between a gate-to-source voltage of the first transistor and a gate-to-source voltage of the second transistor. The temperature sensor also comprises an analog-to-digital converter (ADC) configured to convert the current into a digital temperature reading. The temperature management device is coupled to the temperature sensor, and configured to determine a temperature of a circuit based on the digital temperature reading, and to adjust one or more parameters of the circuit based on the temperature.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A plurality of temperature sensors may be integrated on a chip and used to monitor temperature at various locations on the chip. Temperature readings from the sensors may be fed to a temperature management device that manages circuits (e.g., central processing unit (CPU), graphics processing unit (GPU), modem, etc.) on the chip based on the temperature readings. For example, the temperature management device may manage the circuits based on the temperature readings to prevent the temperature at one or more locations on the chip from becoming too high, which can potentially damage the chip. In this example, if a temperature reading rises above a temperature threshold, then the temperature management device may take steps to reduce the temperature (e.g., reduce a frequency and/or supply voltage of a circuit).

Bipolar-based temperature sensors may be used to measure temperature on a chip. A bipolar-based temperature sensor may comprise two bipolar junction transistors (BJTs), in which the ratio of the currents of the BJTs is fixed and a temperature reading is generated based on the base-emitter voltages of the BJTs. Traditional bipolar-based temperature sensors use complex sigma analog-to-digital converters (ADCs), which consume a relatively large amount of power and occupy a relatively large area of a chip. In addition, these temperature sensors require an analog power supply rail, which is typically at a higher voltage than power supply rails used to power digital logic (e.g., in a CPU). As a result, placement of these temperature sensors is restricted to areas of the chip where analog supply rails are available. This may prevent the placement of one or more of these sensors in a CPU to obtain an accurate temperature reading of a hot spot in the CPU.

Accordingly, small lower power temperature sensors are desirable. Also, temperature sensors that can be powered by power supply rails used to power digital logic are desirable. This would allow the temperature sensors to be placed (embedded) in a circuit (e.g., CPU) comprising digital logic.

Figure 1:
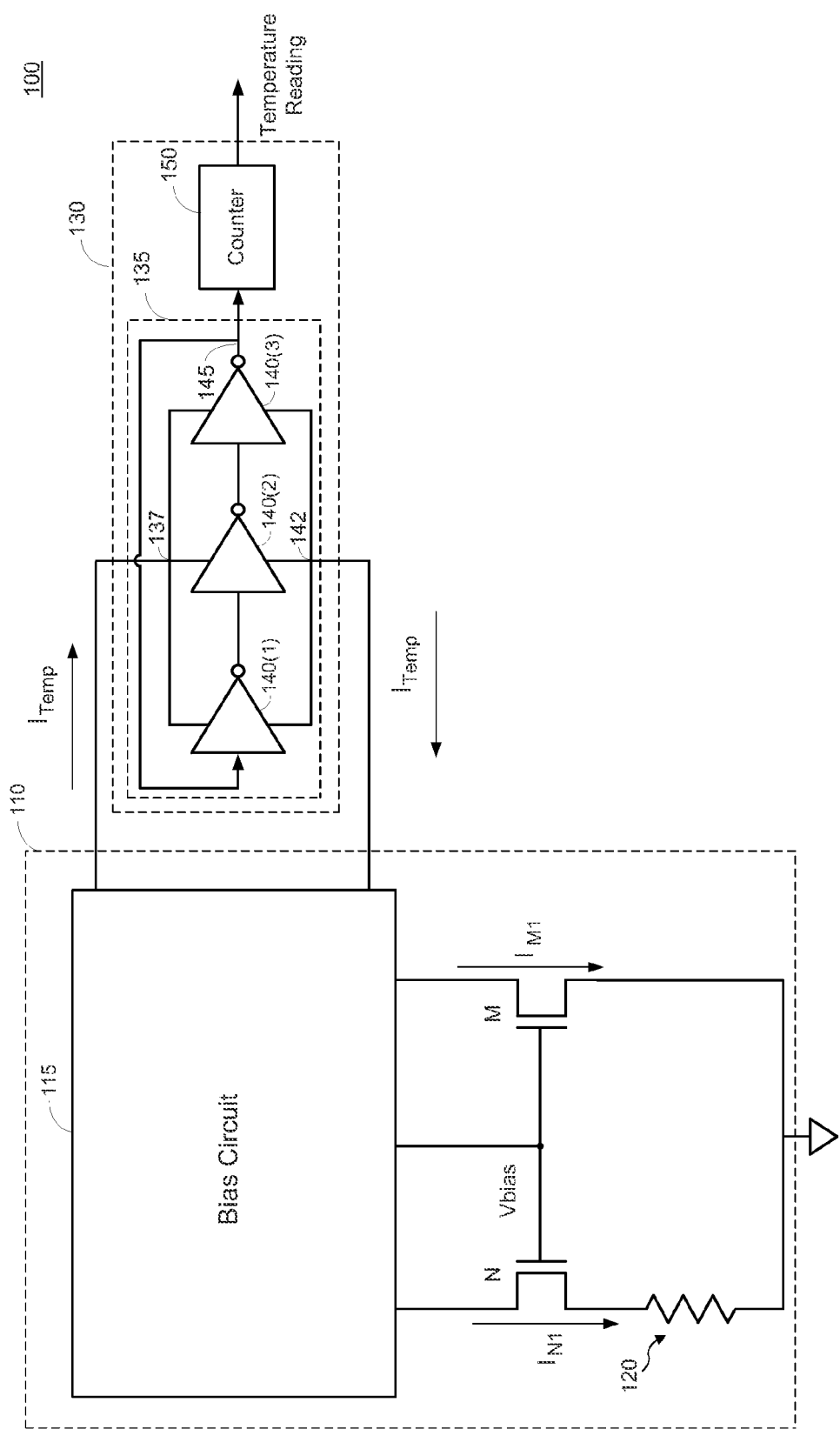
FIG. 1 shows a temperature sensor according to an embodiment of the present disclosure.

FIG. 1 shows a temperature sensor 100 according to an embodiment of the present disclosure. The temperature sensor 100 comprises a temperature-sensing circuit 110 and an analog-to-digital converter (ADC) 130. The temperature-sensing circuit 110 is configured to generate a current (denoted "$I_{Temp}$") that is proportional to temperature, as discussed further below. The ADC 130 is configured to convert the current $I_{Temp}$ from the temperature-sensing circuit 110 into a digital temperature reading.

The temperature-sensing circuit 110 comprises a first transistor N and a second transistor M, both of which may be N-type field-effect transistors (NFETs). The gates of the first and second transistors N and M are coupled together, and biased by a voltage bias Vbias. The temperature-sensing circuit 110 also comprises a resistor 120 coupled between the source of the first transistor N and ground. The source of the second transistor M is coupled to ground. In one aspect, the resistor 120 has a resistance that is approximately temperature invariant over a temperature range of interest, and may comprise a polysilicon resistor or other type of resistor.

The temperature-sensing circuit 110 further comprises a bias circuit 115 coupled to the drains of the first and second transistors N and M, and the gates of the first and second transistors N and M. The bias circuit 115 is configured to sense the current (denoted "$I_{N1}$") of the first transistor N, sense the current (denoted "$I_{M1}$") of the second transistor M, and adjust the voltage bias Vbias at the gates of the first and second transistors N and M based on the sensed currents. More particularly, the bias circuit 115 adjusts the voltage bias Vbias such that a ratio of the currents $I_{N1}$ and $I_{M1}$ of the first and second transistors N and M is approximately constant (fixed) over the temperature range of interest. In one example, the ratio of the currents $I_{N1}$ and $I_{M1}$ may be approximately equal to one, as discussed further below. The bias circuit 115 also adjusts the voltage bias Vbias such that both the first and second transistors N and M operate in the sub-threshold region (i.e., the voltage bias Vbias is below the threshold voltages of the first and second transistors N and M). Operating the first and second transistors N and M under these conditions causes the current of each of the first and second transistors N and M to be proportional to temperature, as explained below.

The current $I_{N1}$ of the first transistor N in the sub-threshold region may be approximately given by:

$$I_{N1} = I_o \cdot \frac{W_N}{L} \cdot e^{\frac{V_{GS\_N}}{V_T}} \quad (1)$$

where $I_o$ is a process dependent constant, $W_N$ is the gate width of the first transistor N, L is the gate length of the first transistor N, $V_{GS\_N}$ is the gate-to-source voltage of the first transistor N, and $V_T$ is the thermal voltage. The bias circuit 115 operates the first transistor N in the sub-threshold region by setting the bias voltage Vbias below the threshold voltage of the first transistor N. The thermal voltage $V_T$ is approximately given by:

$$V_T = \frac{kT}{q} \quad (2)$$

where k is Boltzmann's constant, T is the absolute temperature in Kelvins, and q is the electron charge. The thermal voltage $V_T$ is approximately equal to 26 mV at room temperature, and should not be confused with the threshold voltage of the first transistor N.

The current $I_{M1}$ of the second transistor M in the sub-threshold region may be approximately given by:

$$I_{M1} = I_o \cdot \frac{W_M}{L} \cdot e^{\frac{V_{GS\_M}}{V_T}} \quad (3)$$

where $I_o$ is the process dependent constant, $W_M$ is the gate width of the second transistor M, L is the gate length of the second transistor M, $V_{GS\_M}$ is the gate-to-source voltage of the second transistor M, and $V_T$ is the thermal voltage. The bias circuit 115 operates the second transistor M in the sub-threshold region by setting the bias voltage Vbias below the threshold voltage of the second transistor M. Equation (3) assumes that the first and second transistors N and M have the same gate length L and process dependent constant $I_o$. The first and second transistors N and M may be assumed to have the same process dependent constant $I_o$ since they there are fabricated on the chip in close proximity to each other.

Using equations (1) through (3), the difference between the gate-to-source voltage $V_{GS\_M}$ of the second transistor M and the gate-to-source $V_{GS\_N}$ of the first transistor N can be written as follows:

$$V_{GS\_M} - V_{GS\_N} = \frac{kT}{q} \cdot \ln\left(\frac{W_N}{W_M} \cdot \frac{I_{M1}}{I_{N1}}\right). \quad (4)$$

As discussed above, the bias circuit 115 adjusts the voltage bias Vbias at the gates of the first and second transistor N and M such that the ratio of the currents $I_{N1}$ and $I_{M1}$ is approximately constant over the temperature range of interest. Thus, the ratio of the currents $I_{N1}$ and $I_{M1}$ in equation (4) is approximately constant. Also, the ratio of the gate widths $W_N$ and $W_M$ of the first and second transistors N and M, Boltzmann's constant k and the electron charge q are all approximately constant. Lastly, the resistance R of the resistor 120 is approximately temperature invariant over the temperature range of interest. Thus, all of the terms in equation (4) except temperature T are approximately constant over the temperature range of interest. As a result, the difference between the gate-to-source voltages of the first and second transistors N and M is proportional to temperature, and can therefore be used to measure temperature. In one aspect, the difference between the gate-to-source voltages of the first and second transistors N and M is converted into a current that is proportional to temperature, as discussed further below.

The voltage bias Vbias applied to the gates of the first and second transistors N and M is equal to the gate-to-source voltage $V_{GS\_M}$ of the second transistor M since the source of the second transistor M is grounded. Thus, the voltage Vbias may be written as:

$$V\text{bias} = V_{GS\_M} \tag{5}$$

The voltage bias Vbias is also equal to the sum of the gate-to-source voltage $V_{GS\_N}$ of the first transistor N and the voltage drop across the resistor 120. The voltage drop across the resistor 120 equals $I_{N1} \cdot R$, where R is the resistance of the resistor 120. Thus, the voltage bias Vbias may also be written as:

$$V\text{bias} = V_{GS\_N} + I_{N1} \cdot R \tag{6}$$

Equating the right-hand sides of equations (5) and (6) results in the following:

$$V_{GS\_M} = V_{GS\_N} + I_{N1} \cdot R \tag{7}$$

Equation (7) may be rewritten to express the current $I_{N1}$ of the first transistor N as follows:

$$I_{N1} = \frac{V_{GS\_M} - V_{GS\_N}}{R}. \tag{8}$$

Thus, the current $I_{N1}$ of the first transistor N is equal to the difference between the gate-to-source voltages of the first and second transistors N and M divided by the resistance R of the resistor 120. As discussed above, the difference between the gate-to-source voltages of the first and second transistors N and M is proportional to temperature. Thus, the current $I_{N1}$ of the first transistor N is also proportional to temperature, and can therefore be used to measure temperature. Substituting the expression for $V_{GS\_M} - V_{GS\_N}$ in equation (4) into equation (8) results in the following expression for the current $I_{N1}$ of the first transistor N:

$$I_{N1} = \frac{kT}{qR} \cdot \ln\left(\frac{W_N}{W_M} \cdot \frac{I_{M1}}{I_{N1}}\right). \tag{9}$$

Thus, applying the difference between the gate-to-source voltages of the first and second transistors N and M across the resistor 120 produces a current $I_{N1}$ that is proportional to temperature.

Since the ratio of the currents $I_{N1}$ and $I_{M1}$ of the first and second transistors N and M is approximately constant, the current of the $I_{M1}$ of the second transistor M is approximately equal to the current of the $I_{N1}$ of the first transistor N multiplied by a constant. As a result, the current $I_{M1}$ of the second transistor M is also proportional to temperature T, and can therefore also be used to measure temperature.

In one embodiment, the bias circuit 115 may adjust the voltage bias Vbias such that the currents $I_{N1}$ and $I_{M1}$ of the first and second transistors N and M are approximately equal, in which case the ratio of the currents $I_{N1}$ and $I_{M1}$ is approximately equal to one. As a result, equation (9) reduces to the following:

$$I_{N1} = \frac{kT}{qR} \cdot \ln\left(\frac{W_N}{W_M}\right). \tag{10}$$

In this embodiment, the gate width of the $W_N$ of the first transistor N may be larger than the gate width $W_M$ of the second transistor M. This allows the gate-to-source voltage $V_{GS\_N}$ of the first transistor N to be smaller than the gate-to-source voltage $V_{GS\_M}$ of the second transistor M to accommodate the voltage drop across the resistor 120 while also allowing the first and second transistors N and M to have approximately the same current.

As discussed above, the bias circuit 115 is configured to generate a current $I_{Temp}$ that is proportional to temperature. To do this, the bias circuit 115 may generate the current $I_{Temp}$ from the current $I_{M1}$ of the second transistor M using one or more current mirrors (shown in FIG. 2). In one embodiment, the current $I_{Temp}$ may be proportional to the current $I_{M1}$ of the second transistor M. Since the current $I_{M1}$ of the second transistor M is proportional to temperature, the current $I_{Temp}$ is also proportional to temperature.

The bias circuit 115 provides the current $I_{Temp}$ to the ADC 130, which converts the current $I_{Temp}$ into a digital temperature reading. In this regard, the ADC 130 comprises a ring oscillator 135 and a digital counter 150. The ring oscillator 135 may comprise an odd number of inverters 140(1) to 140(3) coupled into a delay chain, in which the output of the last inverter 140(3) in the delay chain is coupled to the input of the first inverter 140(1) in the delay chain. This causes the ring oscillator 135 to oscillate at an oscillation frequency that is inversely proportional to the time delay of the inverters 140(1) to 140(3). Although the ring oscillator 135 comprises three inverters in the example shown in FIG. 1, it is to be appreciated that the ring oscillator 135 may comprise any odd number of inverters.

The inverters 140(1) to 140(3) of the ring oscillator 135 are biased by the current $I_{Temp}$ from the bias circuit 115, as shown in FIG. 1. More particularly, the bias circuit 115 sources the current $I_{Temp}$ to the top terminal 137 of the ring oscillator 135 and sinks the current $I_{Temp}$ from the bottom terminal 142 of the ring oscillator 135. The current $I_{Temp}$ controls the time delay of the inverters 140(1) to 140(3), and therefore the oscillation frequency of the ring oscillator 135, as discussed further below.

In one aspect, the output of each inverter 140(1) to 140(3) is coupled to a respective capacitor, in which the capacitor may include a capacitor (not shown) coupled between the output of the inverter and the input of the next inverter in the ring oscillator 135 and/or an input capacitor (e.g., gate capacitor) of the next inverter. In this aspect, each inverter transitions from a low output logic state to a high output logic state by charging the respective capacitor and transitions from a high output logic state to a low output logic state by discharging the respective capacitor. The current $I_{Temp}$ flowing into the inverters 140(1) to 140(3) from the bias circuit 115 controls how quickly each inverter is able to charge the respective capacitor, and the current $I_{Temp}$ flowing from the inverters 140(1) to 140(3) into the bias circuit 115 controls how quickly each inverter is able to discharge the respective capacitor. Thus, the current $I_{Temp}$ controls how quickly the inverters 140(1) to 140(3) change logic states, and therefore the time delay of the inverters 140(1) to 140(3). The higher the current $I_{Temp}$, the faster the inverters change logic states, and therefore the shorter the time delay of the inverters.

In this aspect, the time delay of the inverters 140(1) to 140(3) may be approximately inversely proportional to the current $I_{Temp}$ from the bias circuit 115. Since the oscillation frequency of the ring oscillator 135 is inversely proportional to the time delay of the inverters 140(1) to 140(3), the oscillation frequency is approximately proportional to the current $I_{Temp}$ from the bias circuit 115. As discussed above, the current $I_{Temp}$ from the bias circuit 115 is approximately proportional to temperature. As a result, the oscillation frequency of the ring oscillator 135 is approximately proportional to temperature, and can therefore be used to measure temperature.

The digital counter 150 is coupled to an output 145 of the ring oscillator 135, and counts a number of oscillation cycles at the output 145 of the ring oscillator 135. For example, the digital counter 150 may count the number of rising edges and/or the number of falling edges at the output 145 of the ring oscillator 135 over a period of time to generate a digital count value. The digital count value is proportional to the oscillation frequency, which is, in turn, proportional to temperature. Thus, the digital count value is also proportional to temperature, and therefore provides a digital temperature reading.

Thus, the ring oscillator 135 converts the current $I_{Temp}$ from temperature-sensing circuit 110 (which is proportional to temperature) into a frequency, and the counter 150 converts the frequency into a digital temperature reading. The digital temperature reading may be output to a temperature management device (shown in FIG. 4), which may manage one or more circuits on the chip based on the temperature reading.

Figure 2:
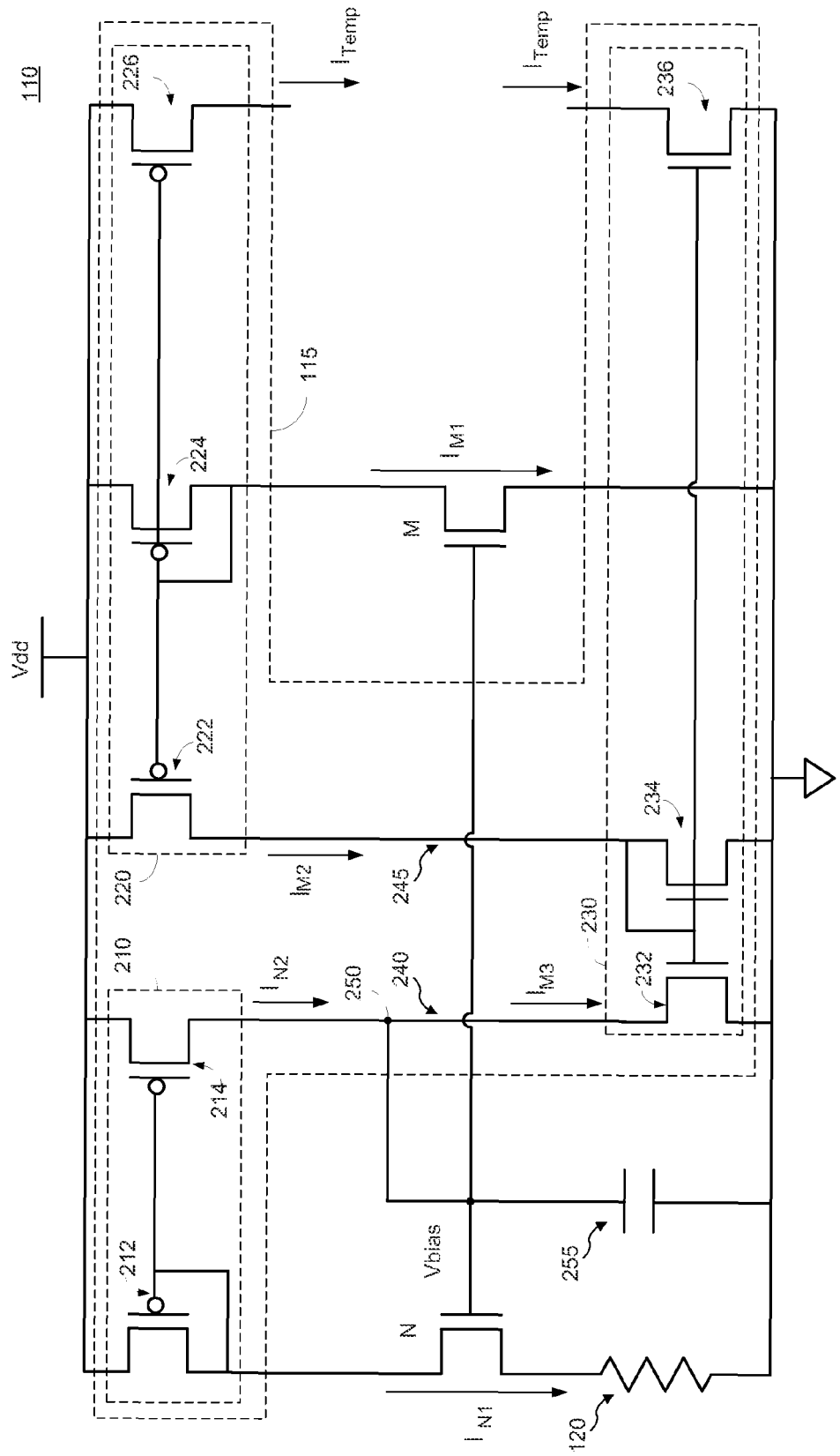
FIG. 2 shows an exemplary implementation of a temperature-sensing circuit comprising transistors operating in the sub-threshold region according to an embodiment of the present disclosure.

FIG. 2 shows an exemplary implementation of the temperature-sensing circuit 110 according to an embodiment of the present disclosure. For ease of illustration, the ADC 130 is not shown in FIG. 2. In this embodiment, the bias circuit 115 comprises a first current mirror 210, a second current mirror 220, and a third current mirror 230.

The first current mirror 210 comprises a first P-type field-effect transistor PFET 212 and a second PFET 214. The gates of the first and second PFETs 212 and 214 are coupled together, and the gate and drain of the first PFET 212 are coupled together. The drain of the first PFET 212 is coupled to the drain of the first transistor N, and the drain of the second PFET 214 is coupled to a first current branch 240.

The second current mirror 220 comprises a third PFET 222, a fourth PFET 224, and a fifth PFET 226. The gates of the third, fourth and fifth PFETs 222, 224 and 226 are coupled together, and the gate and drain of the fourth PFET 224 are coupled together. The drain of the third PFET 222 is coupled to a second current branch 245, the drain of the fourth PFET 224 is coupled to the drain of the second transistor M, and the drain of the fifth PFET 226 is coupled to the top terminal 137 of the ring oscillator 135 (shown in FIG. 1).

The third current mirror 230 comprises a first NFET 232, a second NFET 234, and a third NFET 236. The gates of the first, second and third NFETs 232, 234 and 236 are coupled together, and the gate and drain of the second NFET 234 are coupled together. The drain of the first NFET 232 is coupled to the first current branch 240, the drain of the second NFET 234 is coupled to the second current branch 245, and the drain of the third NFET 236 is coupled to the bottom terminal 142 of the ring oscillator 135 (shown in FIG. 1).

Operations of the bias circuit 115 will now be described according to an embodiment of the present disclosure. For ease of discussion, operations of the bias circuit 115 will first be described using the example in which the bias circuit 115 adjusts the voltage bias Vbias such that the currents $I_{N1}$ and $I_{M1}$ of the first and second transistors N and M are approximately equal. In this example, the PFETs in the first and second current mirrors 210 and 220 may have approximately the same gate dimensions, and the NFETs in the third current mirror 230 may have approximately the same gate dimensions. Also, the transistors in the current mirrors 210, 220 and 230 may operate in the active region. Operations of the bias circuit 115 for the more general case in which the bias circuit 115 adjusts the voltage bias Vbias such that the ratio of the currents $I_{N1}$ and $I_{M1}$ is approximately constant will be discussed later.

In operation, the first PFET 212 senses the current $I_{N1}$ of the first transistor N, and the second PFET 214 replicates (mirrors) the current on a top portion of the first current branch 240 (i.e., above node 250). The replica current on the top portion of the first current branch 240 is denoted "$I_{N2}$". The fourth PFET 224 senses the current $I_{M1}$ of the second transistor M, and the third PFET 222 replicates (mirrors) the current on the second current branch 245. The replica current on the second current branch 245 is denoted "$I_{M2}$". The second NFET 234 senses the replica current $I_{M2}$ of the second transistor M on the second current branch 245, and the first NFET 232 replicates (mirrors) the current on a bottom portion of the first current branch 240 (i.e., below node 250). The replica current on the bottom portion of the first current branch 240 is denoted "$I_{M3}$".

As a result, the current $I_{N1}$ of the first transistor M is replicated (mirrored) on the top portion of the first current branch 240 as current $I_{N2}$, and the current $I_{M1}$ of the second transistor M is replicated (mirrored) on the bottom portion of the first current branch 240 as current $I_{M3}$. If the currents $I_{N2}$ and $I_{M3}$ are different (i.e., the currents $I_{N1}$ and $I_{M1}$ of the first and second transistors N and M are different), then a current equal to the difference flows into or out of node 250 depending on which one of the currents $I_{N2}$ and $I_{M3}$ is larger. This current charges or discharges a capacitor 255 coupled to the gates of the first and second transistors N and M, causing the voltage bias Vbias to rise or fall. The voltage bias Vbias changes in a direction that reduces the difference between the currents $I_{N2}$ and $I_{M3}$ (and hence the difference between the currents $I_{N1}$ and $I_{M1}$ of the first and second transistors N and M). This feedback mechanism adjusts the voltage bias Vbias such that the currents $I_{N1}$ and $I_{M1}$ of the first and second transistors N and M are approximately equal. In this example, both the currents $I_{N1}$ and $I_{M1}$ of the first and second transistors N and M are proportional to temperature, in which each current is approximately given by equation (10) (assuming both transistors N and M are in the sub-threshold region).

In the above example, the bias circuit 115 uses the current mirrors 210, 220 and 230 to adjust the voltage bias Vbias such that the currents $I_N$ and $I_M$ of the first and second transistors N and M are approximately equal. The bias circuit 115 may also adjusts the voltage bias Vbias for the more general case in which the ratio of the currents $I_{N1}$ and $I_{M1}$ is approximately constant. For example, if the ratio of the currents $I_{M1}/I_{N1}$ is to be approximately equal to m, then the gate widths of the transistors in the current mirrors 210, 220 and 230 may be sized such that the current $I_{M3}$ in the first current branch 240 is equal to 1/m times the current $I_{M1}$ of the second transistor M. This may be done by having the gate width of the first NFET 232 equal to 1/m the gate width of the second NFET 234. In this example, the bias circuit 115 adjusts the voltage bias Vbias such that the currents $I_{N2}$ and $I_{M3}$ in the first current branch 240 are approximately equal. Since the current $I_{N2}$ is approximately equal to the current $I_{N1}$ of the first transistor N and the current $I_{M3}$ is approximately equal to 1/m times the current $I_{M1}$ of the second transistor M, this causes the ratio $I_{M1}/I_{N1}$ to be approximately equal to m. In this example, both the currents $I_{N1}$ and $I_{M1}$ of the first and second transistors N and M are proportional to temperature, in which the current $I_{N1}$ of the first transistor N may be given by equation (9) and the current $I_{M1}$ of the second transistor M may be given by equation (9) multiplied by m (assuming both transistors N and M are in the sub-threshold region).

The gate dimensions and/or the threshold voltages of the transistors in the bias circuit 115 may be chosen such that the voltage bias Vbias remains below the threshold voltages of the first and second transistors N and M over the temperature range of interest (and hence the first and second transistors N and M remain in the sub-threshold region). For example, the gate widths of the first and second transistors N and M may be much larger (e.g., at least 10 times larger) than the gate widths of the transistors in the current mirrors 210, 220 and 230. This allows the first and second transistors N and M to operate in the sub-threshold region for current levels at which the transistors in current mirrors 210, 220 and 230 operate in the active region. Alternatively or in addition, the first and second transistors N and M may have higher threshold voltages than the transistors in the current mirrors 210, 220 and 230. By operating the first and second transistors N and M in the sub-threshold region, the currents $I_{N1}$ and $I_{M1}$ of first and second transistors N and M are approximately proportional to temperature, as discussed above.

The fifth PFET 226 in the second current mirror 220 replicates (mirrors) the current $I_{M1}$ of the second transistor M. The resulting replica current is used for the current $I_{Temp}$ flowing into the top terminal 137 of the ring oscillator 135. The third NFET 236 in the third current mirror 230 replicates (mirrors) the current $I_{M2}$ in the second current branch 245, which is a replica of the current $I_{M1}$ of the second transistor M. Thus, the replica current provided by the third NFET 236 is approximately equal to the current $I_{M1}$ of the second transistor M. This replica current is used for the current $I_{Temp}$ flowing out of the bottom terminal 142 of the ring oscillator 135 into the bias circuit 115. Thus, in this embodiment, the current $I_{Temp}$ provided by the bias circuit 115 is approximately equal to the current $I_{M1}$ of the second transistor M. Since the current $I_{M1}$ of second transistor M is proportional to temperature, the current $I_{Temp}$ provided by the bias circuit 115 is also proportional to temperature. This allows the ADC 130 to convert the current $I_{Temp}$ into a digital temperature reading, as discussed above.

The temperature sensor 100 according to various embodiments of the present disclosure provides one or more of the following advantages over convention bipolar-based temperature sensors. First, the temperature sensor 100 may be much smaller and consume much less power than a bipolar-based temperature sensor. This allows a much larger number of temperature sensors to be placed on a chip.

Further, the temperature sensor 100 may be powered using low supply voltages. For example, when fabricated using a 16-nm FinFET process, the temperature sensor 100 may be powered using a supply voltage of 0.79 volts. As a result, the temperature sensor 100 may be powered by a power supply rail used for digital logic. This allows the temperature sensor 100 to be embedded in circuit (e.g., CPU) comprising digital logic, for example, to measure the temperature of a hot spot in the circuit.

Figure 3:
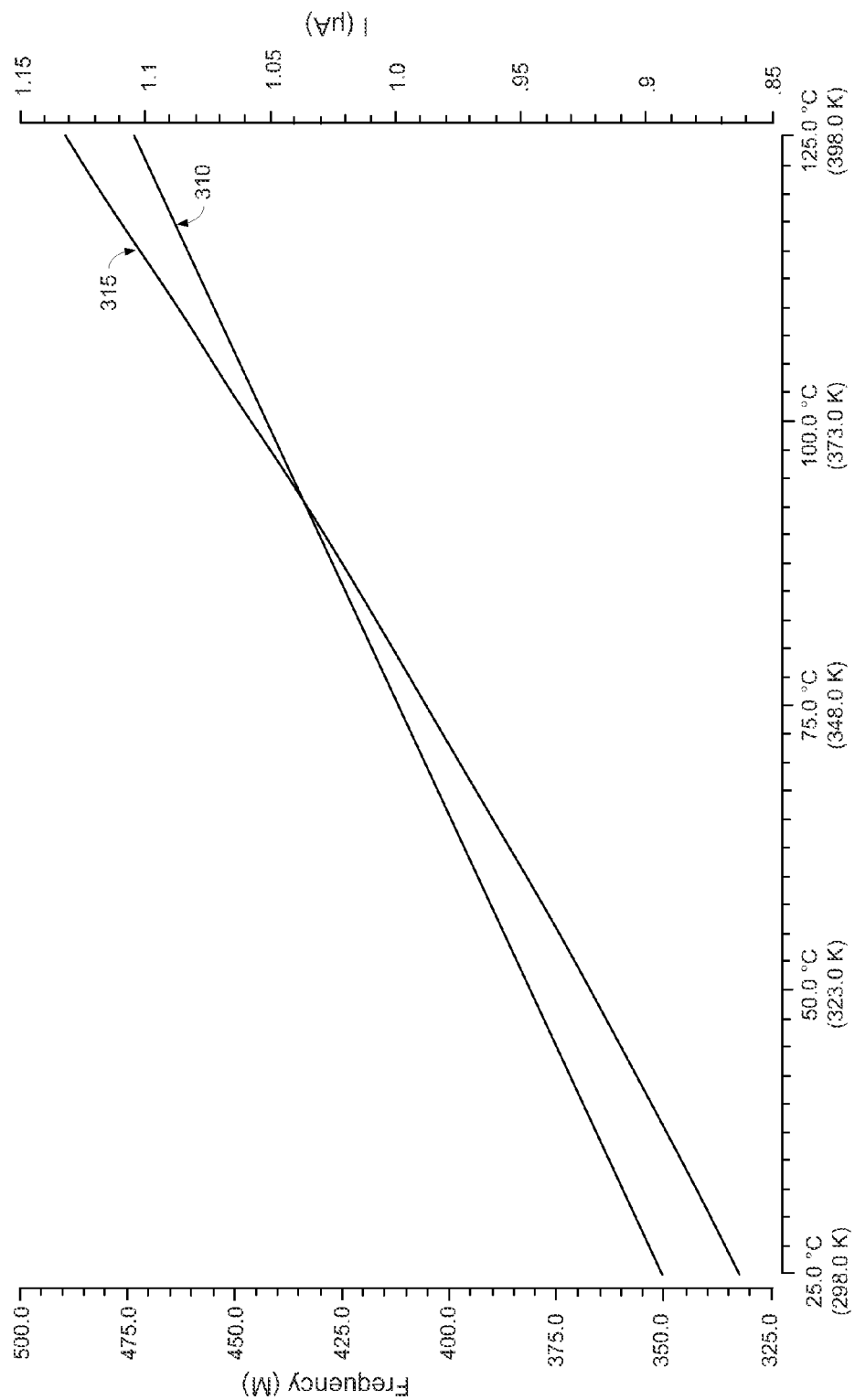
FIG. 3 is a plot showing current and frequency in the temperature sensor as a function of temperature according to an embodiment of the present disclosure.

FIG. 3 is a plot showing an example of current 310 and frequency 315 over a temperature range of 25.0° C. (298 K) to 125.0° C. (398 K) for a temperature sensor 100 according to an embodiment of the present disclosure. In this example, the relationship between the current 310 ($I_{Temp}$) and temperature is approximately linear with a slope approximately equal to 2.118 nA/degree. The current 310 is proportional to absolute temperature (i.e., temperature in Kelvins). Also, the relationship between the frequency 315 of the ring oscillator 135 and temperature is approximately linear with a slope approximately equal to 1.578 MHz/degree. The counter 150 converts the frequency of the ring oscillator 135 into a digital count value that is also linear with temperature. The digital count value provides the digital temperature reading output by the temperature sensor 100.

Figure 4:
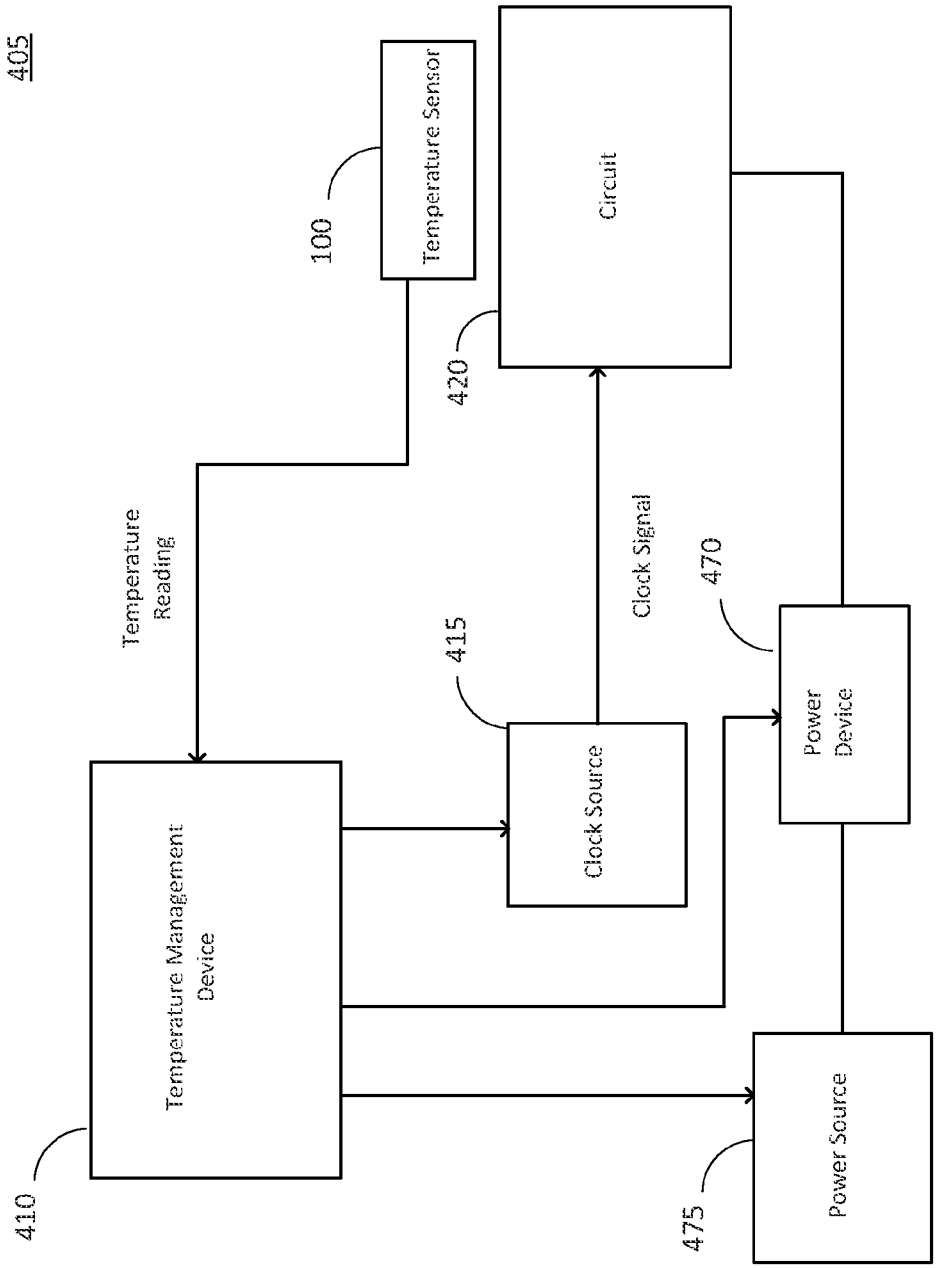
FIG. 4 shows an example of a temperature management device according to an embodiment of the present disclosure.

As discussed above, the temperature sensor 100 may be used in temperature management applications. In this regard, FIG. 4 shows a system 405 comprising the temperature sensor 100, a clock source 415, a temperature management device 410, and a circuit 420 (e.g., a CPU). It is to be appreciated that the temperature sensor 100 in FIG. 4 is not drawn to scale, and may be much smaller than the circuit 420. The system 405 may be integrated on the same chip or die.

The clock source 415 provides a clock signal to the circuit 420, which the circuit 420 may use for data sampling, data processing, timing digital logic, etc. The clock source 415 (e.g., a phase-locked loop (PLL)) is configured to adjust the frequency of the clock signal under the control of the temperature management device 410, as discussed further below.

The temperature sensor 100 measures a temperature of the circuit 420 and outputs a corresponding digital temperature reading to the temperature management device 410. The temperature sensor 100 may be located near the circuit 420 or embedded in the circuit 420 to obtain an accurate temperature reading of the circuit 420. The temperature management device 410 manages the temperature of the circuit 420 by adjusting the frequency of the clock signal based on the temperature reading.

For example, when the temperature reading rises above a thermal threshold, the temperature management device 410 may reduce the frequency of the clock signal to reduce the temperature. This is because reducing the clock frequency reduces the dynamic power consumption of the circuit 420, which, in turn, reduces the temperature. The temperature management device 410 may then dynamically control the clock frequency to keep the temperature reading near the thermal threshold. This minimizes the impact on the performance of the circuit 420 while keeping the temperature of the circuit 420 within a safe limit.

The thermal threshold may be set based on one or more factors. For example, the thermal threshold may be set below a temperature at which the chip enters thermal runaway. Thermal runaway occurs when increases in temperature causes increases in leakage power, which, in turn, causes further increases in temperature. When the chip enters thermal runaway, the temperature of the chip can rapidly rise, potentially damaging the circuit 420. By setting the thermal threshold below the temperature at which the chip enters thermal runaway, the temperature management device 410 prevents thermal runaway from occurring.

The temperature management device 410 may also reduce the temperature of the circuit 420 using other methods. For example, the temperature management device 410 may reduce the temperature by shutting down the circuit 420. In this example, the system 405 may further comprise a power source 475, and a power device 470 (e.g., power switch) between the circuit 420 and the power source 475. The power device 470 may be on the same chip as the circuit 420, and the power source 475 may be external to the chip. When the circuit 420 is in an active state, the power device 470 connects the circuit 420 to the power source 475 to power the circuit 420. When the temperature reading becomes too high (e.g., exceeds a thermal threshold), the temperature management device 410 may command the power device 470 to disconnect the circuit 420 from the power source 475 to shut down the circuit 420. The management device 410 may shut down the circuit 420, for example, in extreme cases where the temperature risks causing severe damage to the circuit 420.

In another example, the temperature management device 410 may reduce the temperature by reducing the supply voltage to the circuit 420. Reducing the supply voltage reduces the dynamic power and leakage power of the circuit 420, which, in turn, reduces the temperature. In this example, the supply voltage to the circuit 420 may be reduced when the clock frequency is reduced. This is because, when the clock frequency is reduced, logic gates in the circuit 420 may operate at slower speeds, which allows the logic gates to operate at a lower supply voltage. In this example, when the temperature management device 410 reduces the clock frequency to reduce temperature, the temperature management device 410 may also reduce the supply voltage to further reduce temperature. To do this, the power source 475 may comprise a power management integrated circuit (PMIC) with a programmable supply voltage. In this example, the temperature management device 410 may set the supply voltage of the PMIC by sending a voltage command to the PMIC. Thus, the temperature management device 410 may use a combination of frequency and voltage scaling to manage the temperature of the circuit 420.

Although one temperature sensor 100 is shown in FIG. 4 for ease of illustration, it is to be appreciated that the system 405 may comprise a plurality of temperature sensors. For example, the chip may comprise a plurality of circuits (e.g., one or more CPUs, a graphics processor unit (GPU), a modem, etc.). In this example, the system 405 may comprise one or more temperature sensors for each circuit. The temperature management device 410 may manage the temperature of each circuit based on temperature readings from the respective one or more temperature sensors using any of the methods discussed above.

The temperature management device 410 may also calibrate the temperature sensor 100 to obtain more accurate temperature measurements from the temperature sensor 100. The relationship between the digital count value (digital temperature reading) from the counter 150 and temperature is approximately linear, and may therefore be approximated by a line in a count-versus-temperature plot. However, the position of the line in the plot may vary from sensor to sensor due to process variations and/or other factors. To address this, a calibration procedure may be performed to determine the position of the line for the temperature sensor 100.

Figure 5:
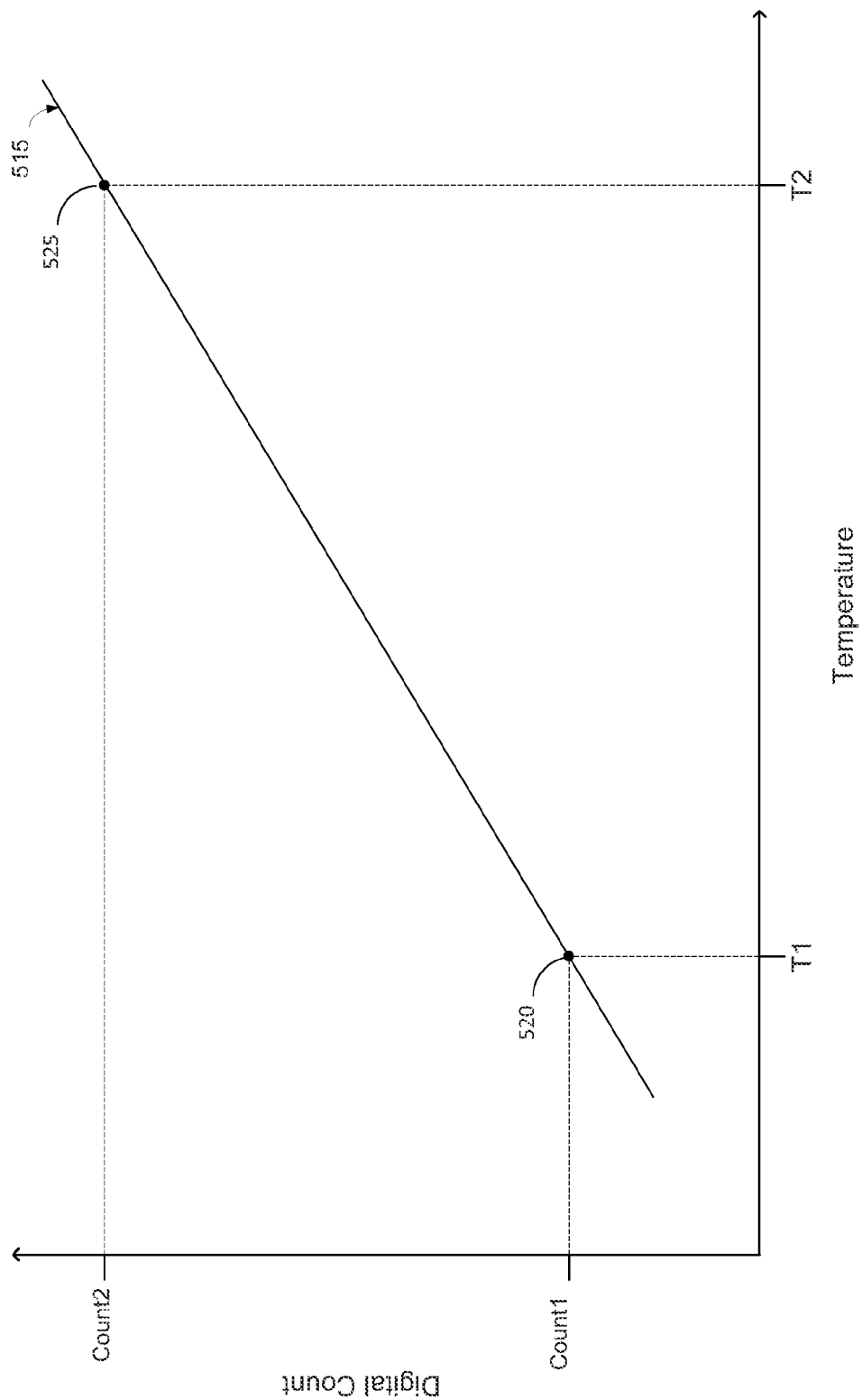
FIG. 5 is a plot illustrating an example of temperature calibration according to an embodiment of the present disclosure.

In this regard, FIG. 5 is a count-versus-temperature plot illustrating an exemplary calibration procedure according to an embodiment of the present disclosure. The calibration procedure may include uniformly heating the chip on which the temperature sensor 100 is fabricated to a first known temperature (denoted "T1"). For example, the chip may be uniformly heated using an external heating device, and the temperature may be measured using a high-accuracy external temperature sensor (e.g., thermally coupled to a back surface of the chip). The circuit 420 may be powered off during this time. The temperature management device 410 may then read a corresponding first count value (denoted "count1") from the temperature sensor 100. Since the first temperature T1 is known, this provides enough information to determine a first point 520 in the count-versus-temperature plot for the temperature sensor 100.

The chip is then heated to a second known temperature (denoted "T2"). The temperature management device 410 may then read a corresponding second count value (denoted "count2") from the temperature sensor 100. Since the second temperature T2 is known, this provides enough information to determine a second point 525 in the count-versus-temperature plot for the temperature sensor 100. The first and second points 520 and 525 provide enough information to determine the temperature for other count values. This is because the other count values lie on a line 515 intersecting the first and second points 520 and 525 due to the linear relationship between the count value and temperature.

Thus, once the two points 520 and 525 are determined, the temperature for other count values may be determined using linear interpolation. In this embodiment, the first and second count values may be stored in a memory in the temperature management device 410 and associated with the first and second temperatures, respectively, in the memory. The temperature management device 410 may use the stored information for the temperature sensor 100 to determine the temperature for other count values from the temperature sensor 100 (e.g., using linear interpolation).

Figure 6:
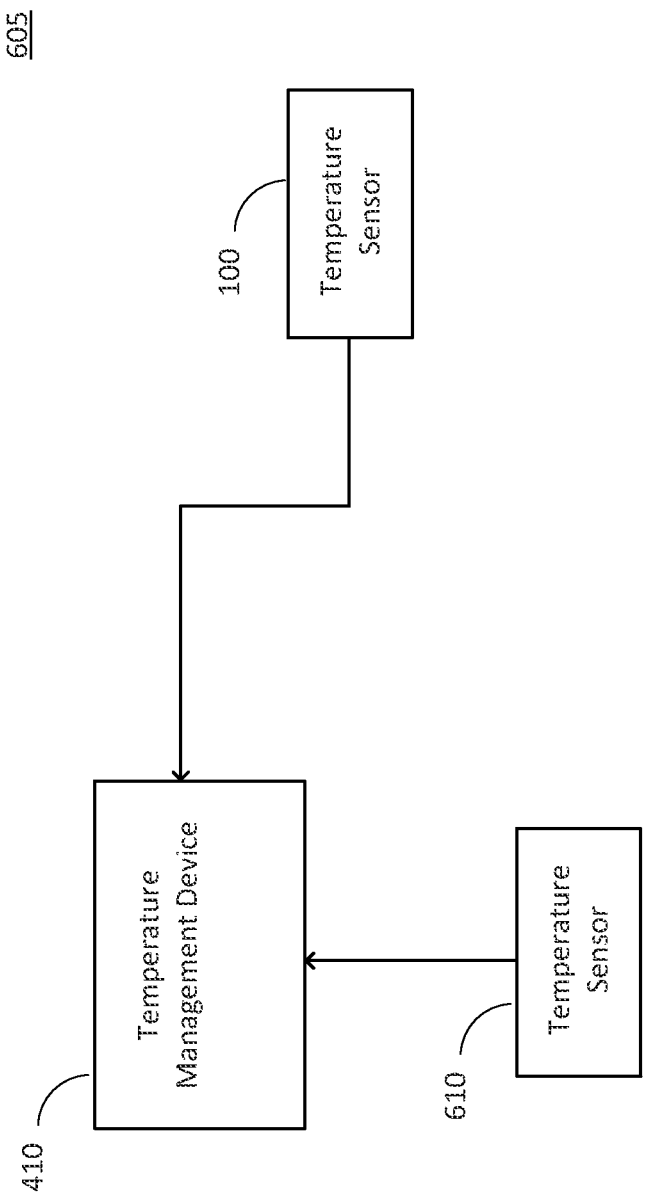
FIG. 6 shows an example of a system for calibrating the temperature sensor according to an embodiment of the present disclosure.

In the above example, the temperature of the chip is measured during calibration using an external temperature sensor. In another example, the temperature of the chip may be measured during calibration using an accurate on-chip temperature sensor. In this regard, FIG. 6 shows a system 605 comprising the temperature sensor 100, the temperature management device 410, and an on-chip calibration temperature sensor 610. The calibration temperature sensor 610 may comprise a bipolar-based temperature sensor or other type of on-chip temperature sensor. In this example, the calibration temperature sensor 610 may be used to calibrate many temperature sensors according to embodiments of the present disclosure. The system 605 may be integrated on the same chip.

In this example, the calibration procedure for the temperature sensor 100 may include uniformly heating the chip to a first temperature (e.g., using an external heating device). The calibration temperature sensor 610 may measure the first temperature and output the corresponding temperature reading to the temperature management device 410. The temperature management device 410 may then read a corresponding first count value from the temperature sensor 100. The circuit 420 may be powered off during this time. The temperature management device 410 may then store the first count value and the first temperature in memory, where the first temperature is provided by the temperature reading from the calibration temperature sensor 610.

The chip is then heated to a second temperature. The calibration temperature sensor 610 may measure the second temperature and output the corresponding temperature reading to the temperature management device 410. The temperature management device 410 may then read a corresponding second count value from the temperature sensor 100. The circuit 420 may be powered off during this time. The temperature management device 410 may then store the second count value and the second temperature in memory, where the second temperature is provided by the temperature reading from the calibration temperature sensor 610. The temperature management device 410 may then use the stored information for the temperature sensor 100 to determine the temperature for other count values from the temperature sensor 100 (e.g., using linear interpolation), as discussed above.

Figure 7:
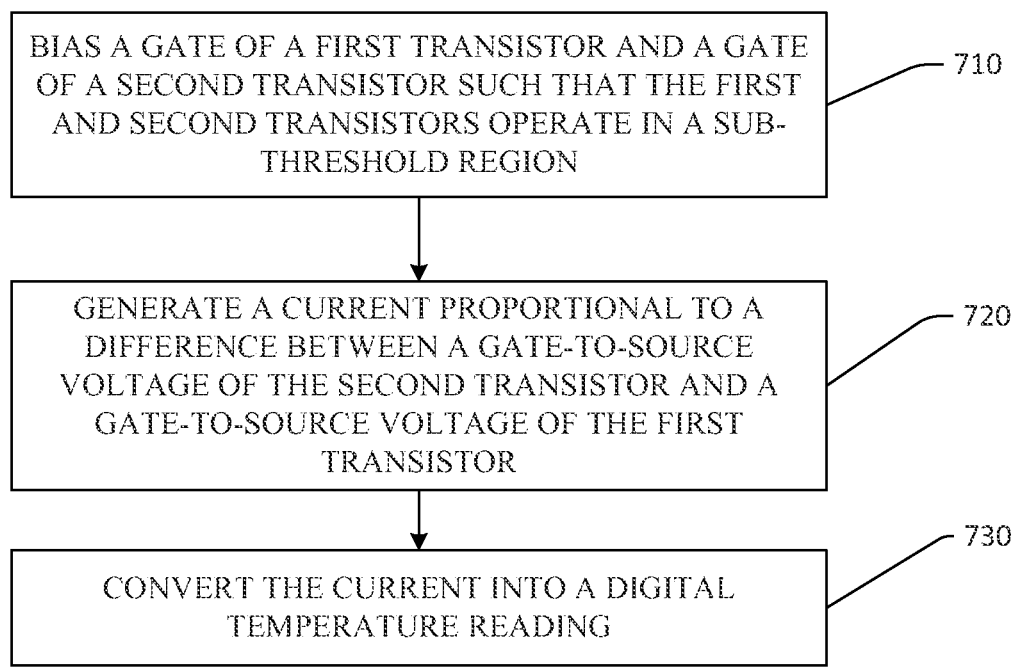
FIG. 7 is a flowchart of a method for sensing temperature according to an embodiment of the present disclosure.

FIG. 7 is a flowchart illustrating a method 700 for sensing temperature according to an embodiment of the present disclosure. The method 700 may be performed by the temperature sensor 100.

In step 710, a gate of a first transistor and a gate of a second transistor are biased such that the first and second transistors operate in a sub-threshold region. For example, the gates of the first and second transistors (e.g., first and second transistors N and M) may be biased at a voltage bias (e.g., Vbias) that is below the threshold voltages of the first and second transistors.

In step 720, a current proportional to a difference between a gate-to-source voltage of the second transistor and a gate-to-source voltage of the first transistor is generated. For example, the current (e.g., $I_{Temp}$) may be generated by applying the difference between the gate-to-source voltage of the second transistor and the gate-to-source voltage of the first transistor (e.g., $V_{GS\_M}-V_{GS\_N}$) across a resistor (e.g., resistor 120), wherein the generated current is proportional to a current flowing through the resistor.

In step 730, the current is converted into a digital temperature reading. For example, the current may be converted into a frequency by a current-controlled oscillator (e.g., oscillator 135), and the frequency may be converted into the digital temperature reading (e.g., digital count value) by a counter (e.g., counter 150).

Those skilled in the art would appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A temperature sensor, comprising:
a first transistor having a gate;
a second transistor having a gate coupled to the gate of the first transistor;
a bias circuit configured to bias the gates of the first and second transistors wherein the first and second transistors operate in a sub-threshold region, and to generate a current proportional to a difference between a gate-to-source voltage of the first transistor and a gate-to-source voltage of the second transistor using a resistor coupled to a source of the second transistor, wherein the difference between the gate-to-source voltage of the first transistor and the gate-to-source voltage of the second transistor is applied across the resistor, and the generated current is proportional to a current flowing through the resistor; and
an analog-to-digital converter (ADC) configured to convert the current into a digital temperature reading.

2. The temperature sensor of claim 1, wherein the ADC comprises:
an oscillator configured to convert the current into a frequency; and
a counter configured to convert the frequency into a digital count value, wherein the digital temperature reading comprises the digital count value.

3. The temperature sensor of claim 1, wherein the generated current is approximately equal to the current flowing through the resistor.

4. The temperature sensor of claim 1, wherein the resistor is coupled between the source of the second transistor and a ground.

5. The temperature sensor of claim 1, wherein the first transistor comprises a first field effect transistor (FET) and the second transistor comprises a second FET.

6. The temperature sensor of claim 1, wherein the bias circuit is configured to bias the gates of the first and second transistors such that a ratio of a current of the first transistor and a current of the second transistor is approximately constant over a temperature range.

7. The temperature sensor of claim 6, wherein the ratio is approximately equal to one.

8. The apparatus of claim 1, further comprising a capacitor coupled to the gates of the first and second transistors.

9. The apparatus of claim 1, wherein the bias circuit further comprises a plurality of current mirrors each coupled to at least one of the first and second transistors.

10. The apparatus of claim 9, wherein each of the plurality of current mirrors include a plurality of Field Effect transistors (FETs).

11. The apparatus of claim 10, wherein:
the plurality of FETs in each of the plurality of current mirrors are configured with gate widths of a first gate width; and
the first and second transistors configured with second gates widths that are substantially larger than the first gate width;
wherein the first and second transistors operate in the sub-threshold region while the plurality of FETs in the plurality of current mirrors operate in an active region.

12. A method for sensing temperature, comprising:
biasing a gate of a first transistor and a gate of a second transistor such that the first and second transistors operate in a sub-threshold region;
generating a current proportional to a difference between a gate-to-source voltage of the first transistor and a gate-to-source voltage of the second transistor; and
converting the current into a digital temperature reading;
wherein generating the current comprises applying the difference between the gate-to-source voltage of the first transistor and the gate-to-source voltage of the second transistor across a resistor, wherein the generated current is proportional to a current flowing through the resistor.

13. The method of claim 12, wherein converting the current into the digital temperature reading comprises:
converting the current into a frequency; and
converting the frequency into a digital count value, wherein the digital temperature reading comprises the digital count value.

14. The method of claim 12, wherein the generated current is approximately equal to the current flowing through the resistor.

15. The method of claim 12, wherein the first transistor comprises a first field effect transistor (FET) and the second transistor comprises a second FET.

16. The method of claim 12, further comprising biasing the gates of the first and second transistors such that a ratio of a current of the first transistor and a current of the second transistor is approximately constant over a temperature range.

17. The method of claim 16, wherein the ratio is approximately equal to one.

18. The method of claim 12, further comprising:
coupling a capacitor to the gates of the first and second transistors, the capacitor causing adjustment of the biasing of the gates of the first and second transistors.

19. The method of claim 12, wherein biasing further comprises mirroring one or more currents flowing into or out of the first and second transistors with one or more current mirrors coupled to at least one of the first and second transistors.

20. The method of claim 19, wherein:
each of the one or more current mirrors include a plurality of Field Effect transistors (FETs) that are configured with gate widths of a first gate width;
the first and second transistors configured with second gates widths that are substantially larger than the first gate width; and
operating the first and second transistors in the sub-threshold region while operating the plurality of FETs in the one or more current mirrors in an active region due the respective gate widths.

21. An apparatus for sensing temperature, comprising:
means for biasing a gate of a first transistor and a gate of a second transistor such that the first and second transistors operate in a sub-threshold region;
means for generating a current proportional to a difference between a gate-to-source voltage of the first transistor and a gate-to-source voltage of the second transistor; and
means for converting the current into a digital temperature reading;
wherein the means for generating the current comprises means for applying the difference between the gate-to-source voltage of the first transistor and the gate-to-source voltage of the second transistor across a resistor, wherein the generated current is proportional to a current flowing through the resistor.

22. The apparatus of claim 21, wherein the means for converting the current into the digital temperature reading comprises:
   means for converting the current into a frequency; and
   means for converting the frequency into a digital count value, wherein the digital temperature reading comprises the digital count value.

23. The apparatus of claim 21, wherein the generated current is approximately equal to the current flowing through the resistor.

24. The apparatus of claim 21, wherein the first transistor comprises a first field effect transistor (FET) and the second transistor comprises a second FET.

25. The apparatus of claim 21, further comprising means for biasing the gates of the first and second transistors such that a ratio of a current of the first transistor and a current of the second transistor is approximately constant over a temperature range.

26. The apparatus of claim 25, wherein the ratio is approximately equal to one.

27. The apparatus of claim 21, further comprising:
   means for adjusting the means for biasing the gate of the first transistor and the gate of the second transistor, the means for adjusting including a capacitor coupled to the gates of the first and second transistors.

28. The apparatus of claim 21, wherein the means for means for biasing the gate of the first transistor and the gate of the second transistor further comprises means for current mirroring currents of the first and second transistors.

29. The apparatus of claim 28, wherein means for current mirroring includes a plurality of Field Effect transistors (FETs).

30. The apparatus of claim 29, wherein:
   the plurality of FETs in the means for current mirroring configured with gate widths of a first gate width; and
   the first and second transistors configured with second gates widths that are substantially larger than the first gate width;
   wherein the first and second transistors operate in the sub-threshold region while the plurality of FETs in the plurality of current mirrors operate in an active region due the respective gate widths.

* * * * *